UNITED STATES PATENT OFFICE.

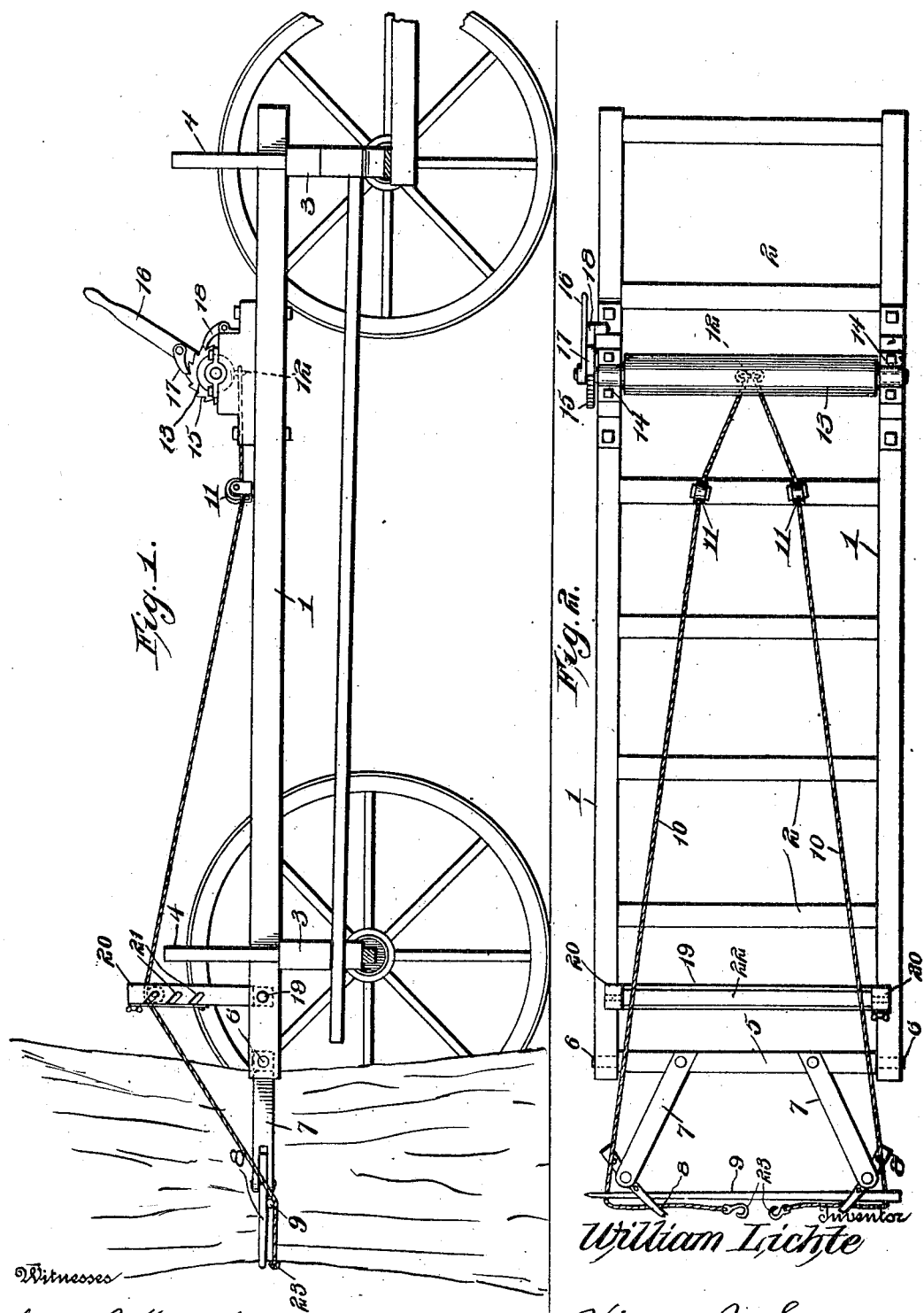

WILLIAM LICHTE, OF BIGSPRING, MISSOURI.

LOADING-FRAME.

No. 830,340.　　　　　Specification of Letters Patent.　　　　　Patented Sept. 4, 1906.

Application filed February 28, 1906. Serial No. 303,490.

*To all whom it may concern:*

Be it known that I, WILLIAM LICHTE, a citizen of the United States, residing at Bigspring, in the county of Montgomery and State of Missouri, have invented new and useful Improvements in Loading-Frames, of which the following is a specification.

This invention relates to loading-frames, having for its object to provide a simple, cheap, and practicable loading device designed for use upon any ordinary low wagon or truck, said frame comprising a tilting fork forming a seat for the object to be lifted and loaded upon the wagon and operating mechanism for positioning the object to be lifted and subsequently operating or tilting the fork so as to draw the object held thereby upward upon the frame and wagon.

With the above general object in view the invention consists in the novel construction, combination, and arrangement of parts hereinafter more fully described, illustrated, and claimed.

In the accompanying drawings, Figure 1 is a side elevation of an ordinary low wagon, showing the improved apparatus mounted thereon. Fig. 2 is a plan view of the loading-frame and mechanism contained thereon.

The frame of the device may be varied considerably in construction, but the preferred embodiment thereof, as illustrated in the drawings, shows said frame as comprising the side longitudinal bars 1, connected by a series of bars 2, rigidly connecting the side bars and forming an elongated rectangular frame which is adapted to be mounted upon the bolsters 3 of an ordinary low-geared wagon, as illustrated in Fig. 1, the frame of the loading device being confined between the ordinary stanchions or side stakes 4. At one end, usually the rear end, there is arranged a rock-shaft 5, which extends transversely across the frame and is suitably journaled at its ends 6 therein. Extending rearward divergently from said rock-shaft is a fork comprising the fork-arms 7. These arms may be of any desired length and are provided at their extremities with extension arms or fingers 8, which are curved and adapted to extend around or partially embrace the shock, as shown in Fig. 1. Extending beneath the arms or the extensions thereof is a long pin or spear 9, the length of which is proportioned to enable the ends thereof to extend outward and project from opposite sides of the shock, so as to receive beneath them the rear ends of two ropes or cables 10, which extend forward and pass under guide-pulleys 11 on one of the cross-bars 2, the forward ends of said ropes or cables being connected at 12 to the drum 13 of a windlass, said windlass being journaled in suitable bearings 14 on the frame. Associated with the shaft of said windlass is a ratchet-wheel 15, fast thereon and operated by means of a lever 16, carrying a pawl 17, which engages said ratchet-wheel 15 for winding up the drum and the ropes or cables 10, 18 designating a detent for holding the drum in any position.

Arranged near the rear end of the frame and adjacent to the fork-arms 7 and rock-shaft 5 is a tilting frame comprising a rock-shaft 19 and upwardly-extending arms 20 at opposite ends thereof, the arms 20 being notched at different elevations, as shown at 21, to receive the end journals of a roller 22, which is thus adjustable up and down on the arms 20. The arms 20 normally extend upward to hold the roller 22 elevated, and the ropes or cables 10 pass over the roller 22, so that as the windlass is turned an upward pull is given to the shock, as will be understood from an examination of Fig. 1. As the shock is raised the arms 7 swing upward and inward until the shock comes in contact with the roller 22, whereupon the arms 20 swing forward, together with the arms 7 of the fork, thus depositing the shock on the frame of the loading attachment. The shock is then released from the lifting mechanism and may be deposited on any desired part of the loading frame or wagon. Other shocks may be successively loaded onto the wagon in the manner above described. The rear ends of the ropes 10 are provided with hooks 23, so that said ropes may be coupled together around the shock.

I claim—

1. A loading device for wagons comprising a frame, a rock-shaft journaled in one end of said frame, fork-arms extending rearwardly and divergently from said rock-shaft and carrying shock-embracing extensions or fingers, a pin or spear insertible through the shock and of sufficient length to extend at opposite ends beyond the shock, and ropes or cables connected with the windlass and adapted to be wound thereon, said ropes or cables being adapted to pass beneath the projecting ends of the pin or spear which lies beneath the fork-arms or the extensions thereof, substantially as described.

2. A loading device for wagons comprising a frame, a rock-shaft journaled at one end thereof and provided with shock-embracing arms, a pin or spear insertible through the shock beneath the said arms, a windlass, ropes or cables extending from the windlass to and adapted to pass under said pin or spear, and a tilting roller-carrying frame mounted on the loading-frame, said tilting frame comprising arms each having a plurality of notches adapted to receive the journals of the roller carried thereby to admit of the up-and-down adjustment of said roller, substantially as and for the purpose described.

In testimony whereof I affix my signature in presence of two witnesses.

WILLIAM LICHTE.

Witnesses:
    GUSS HOENELMAN,
    VANCE GENTRY.